United States Patent [19]
Liber

[11] 3,830,363
[45] Aug. 20, 1974

[54] APPARATUS BOX, MORE PARTICULARLY INTENDED TO CONTAIN CASSETTES COMPRISING MAGNETIC TAPES

[75] Inventor: Michel Liber, Paris, France

[73] Assignee: Seilib, Seine, France

[22] Filed: June 27, 1972

[21] Appl. No.: 266,734

[52] U.S. Cl. ................. 206/387, 206/521, 220/4 B, 220/23.4, 220/31 S
[51] Int. Cl.. B65d 85/30, B65d 85/62, B65d 85/67
[58] Field of Search............ 206/387, DIG. 36, 521, 206/523, 455, 456, 316, 72, 73; 229/2.5, 51 DB; 220/21, 22, 23.4, 23.83, 23.86, 4 B, 31 S; 211/41

[56] References Cited

UNITED STATES PATENTS

| | | | |
|---|---|---|---|
| 2,282,908 | 5/1942 | Thompson | 206/521 |
| 2,614,399 | 10/1952 | Roethel | 220/23.4 |
| 3,139,979 | 7/1964 | Russell | 229/41 DB |
| 3,155,264 | 11/1964 | Shook | 206/455 |
| 3,163,289 | 12/1964 | Laffkas et al. | 206/523 |
| 3,235,068 | 2/1966 | Asnes et al. | 206/456 |
| 3,400,809 | 9/1968 | Puente | 206/455 |
| 3,415,407 | 12/1968 | Alden et al. | 220/4 B |
| 3,710,900 | 1/1973 | Fink | 206/387 |
| 3,756,383 | 9/1973 | Kryster | 206/387 |

*Primary Examiner*—William T. Dixson, Jr.
*Attorney, Agent, or Firm*—Karl W. Flocks

[57] ABSTRACT

The box according to the invention is capable of receiving at the same time mini-cassettes and long period cassettes or either of these types alone.

It is constituted by two identical box elements mounted hinged together, separation ribs spaced apart by a distance slightly greater than the thickness of a mini-cassette being provided in the interior of each element on two of its opposite walls, and other separation ribs spaced apart by a distance slightly greater than the thickness of a long period cassette being provided in the interior of each element on the other two opposite walls, so that when the two box elements are closed against each other, the cassettes placed in one of the two box elements come into contact with the cassettes placed in the other element. An elastic mat is preferably placed in the bottom of each box element.

7 Claims, 4 Drawing Figures

PATENTED AUG 20 1974 3,830,363

SHEET 2 OF 3

APPARATUS BOX, MORE PARTICULARLY INTENDED TO CONTAIN CASSETTES COMPRISING MAGNETIC TAPES

The present invention has for its object an apparatus box intended more particularly to contain cassettes housing magnetic tapes for tape recorders for packing tightly together and facilitating transport.

In particular, there exist cassettes of this kind known as "mini-cassettes" having a given parallelepiped shape. There also exist other cassettes of the same length and height but of different thickness, which are sometimes know as "long duration cassettes" because the magnetic tape which they contain enables longer periods of recording and playing-back to be obtained.

The box according to the invention is capable of receiving at the same time mini-cassettes and long period cassettes or either of these types alone.

It is essentially characterized in that it is constituted by two identical box elements mounted hinged together, the internal height of each corresponding substantially to the height of the cassettes, while the equal internal sides are slightly greater than the length of the cassettes, separation ribs spaced apart by a distance slightly greater than the thickness of a mini-cassette being provided in the interior of each element on two of its opposite walls, and other separation ribs spaced apart by a distance slightly greater than the thickness of a long-period cassette being provided in the interior of each element on the other two opposite walls, so that when the two box elements are closed against each other, the cassettes placed in one of the two box elements come into contact with the cassettes placed in the other element.

An elastic mat is preferably placed in the bottom of each box element in such manner that when the cassettes come into contact, the mats yield slightly beneath them and thus tends to block the cassettes against each other when the box elements are totally closed and so that, when opening, the extraction of the cassettes is facilitated and the mat then reassumes its normal size.

A bolt is provided for immobilizing together the two box elements in their closed position.

Other characteristic features and advantages of the present invention will be brought out in the description which follows below, reference being made to the accompanying drawings, in which.

Figure 1:
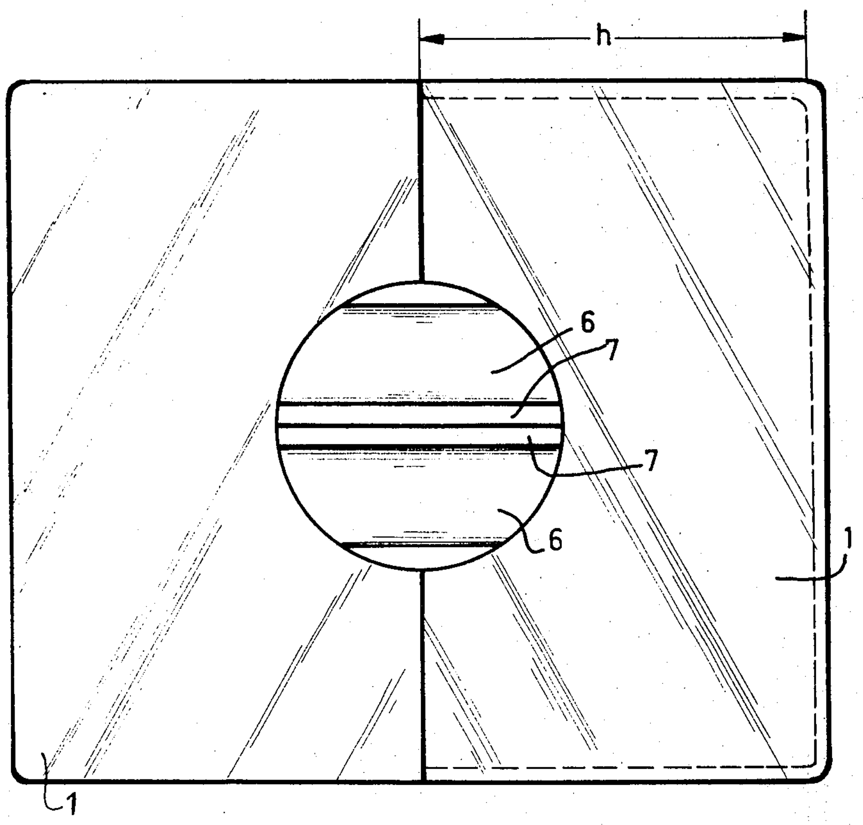
FIG. 1 is a front view of an apparatus box according to the invention.
Figure 2:
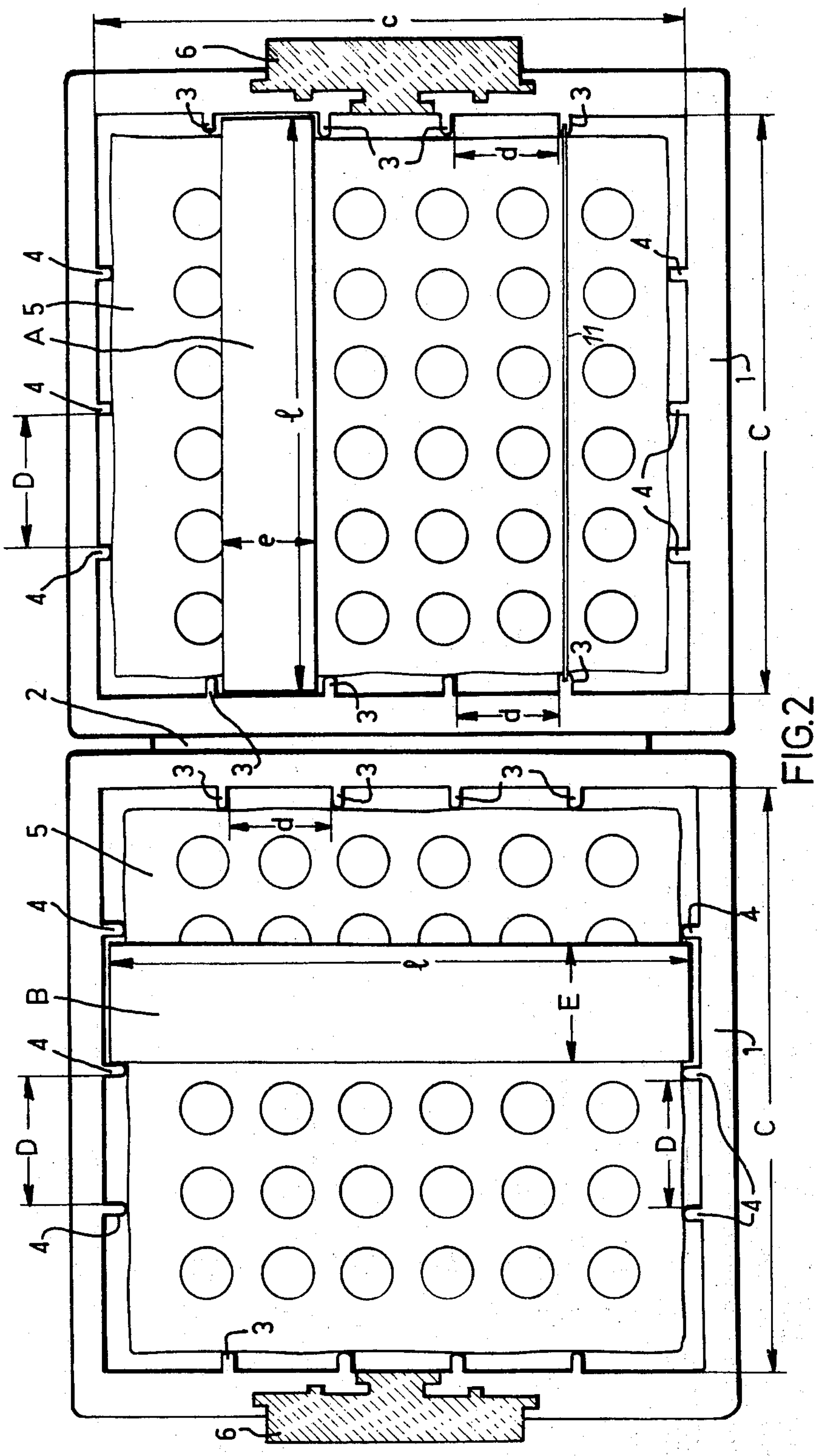
FIG. 2 is a view looking on the top of this box when it has been opened.

In the form of construction shown, an apparatus box according to the invention is constituted by two identical box elements 1 joined together by a hinge 2. The internal height *h* of each box element corresponds substantially to the height of the cassettes, which is the same for the mini-cassettes A and the long-period cassettes B. The equal internal sides *c* of each element are slightly greater than the length *l* of the cassettes, which is the same for the mini-cassettes A and the long-period cassettes B.

Separation ribs 4, spaced apart by a distance D slightly greater than the thickness E of the long-period cassettes B, are provided on the two other opposite internal walls of each box element.

In this way, in either of the box elements it is possible to arrange a mini-cassette A in each space *c–d*. In either of the box elements, it is similarly possible to arrange a long-period cassette in each space C–D.

At the extremities of the sides *c*, the distance *d* or D existing between a separation rib 3 or 4 and the wall perpendicular to that which carries it, is slightly greater in order to take account of the separation rib carried by this perpendicular wall.

An elastic mat 5 is placed in the bottom of each box element. Under these conditions, before the box is closed, the cassettes extend slightly beyond the box elements in which they are housed.

When the box elements 1 are brought together by pivoting about their hinge 2 in order to close the box, the cassettes come into contact and are pressed against each other until the mat 5 yields so as to bring the edges of the two elements 1 into perfect contact. The cassettes are thus effectively blocked without any possibility of movement. When opening, the mat facilitates the extraction of the cassettes by springing back to its original form.

A rotary bolt with two identical latches 6 of semi-circular shape with operating projections 7 enables the box to be held closed.

Figures 3, 4:
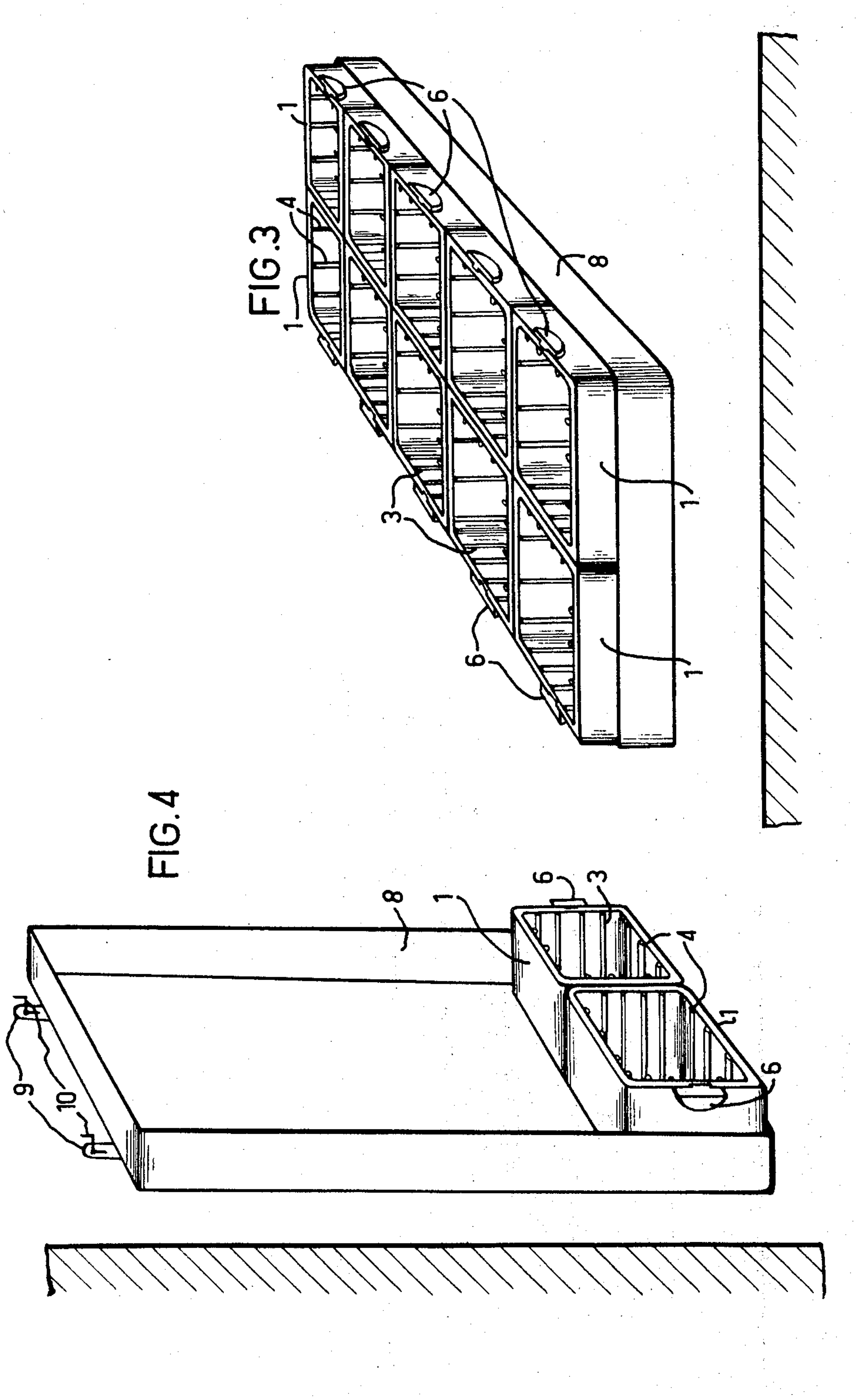
FIG. 3 is a perspective view of an assembly of a number of boxes according to the invention, placed side by side in a single carrying tray.
FIG. 4 shows, also in perspective, one only of these boxes arranged in the tray which is suspended.

A number of apparatus boxes according to the invention may be joined together side by side in the open position inside a carrying tray 8, which provides a rapid means of consultation of the mini-cassettes and long-period cassettes which they contain. This tray may rest flat as in FIG. 3 or it may be suspended by lugs 9 from hooks 10, as shown in FIG. 4, or by any other suspension device.

Each box according to the invention can be easily carried by holding it in the hand or by means of an appropriate gripping device, such as an articulated handle or a tassel (not shown).

The ribs 3 (like the ribs 4) may be provided with longitudinal grooves so as to receive removable separations 11 which are useful when the cassettes are not provided with cases.

It will of course be understood that the present invention has only been described and illustrated by means of a preferred example, and that equivalents may be made in its constituent elements without thereby departing from the scope of the said invention as defined in the appended claims.

I claim:

1. An apparatus box, more particularly capable of receiving at the same time mini-cassettes and long-period cassettes for tape recorders or either of these types alone, characterized in that it is constituted by two identical box elements arranged so as to be closed one against the other, the internal height of each element corresponding substantially to the height of the cassettes, while the equal internal sides are slightly greater than the length of the cassettes, separation ribs spaced apart by a distance slightly greater than the thickness of a mini-cassette being provided in the interior of each of said elements on two of its opposite walls, and other separation ribs spaced apart by a distance slightly greater than the thickness of a long-period cassette being provided in the interior of each of said elements on the other two opposite walls, whereby, when the two said box elements are closed against each other, the cassettes placed in one of the two box elements come into contact with the cassettes placed in the other said element.

2. A box in accordance with claim 1, in which an elastic mat is placed in the bottom of each of said box elements so that before closing the box, the cassettes extend slightly beyond the said box elements in which they are housed and that the cassettes coming into contact, the said mat is compressed by the cassettes thus fixing the latter against each other when the closure is complete, while upon opening, the extraction of the cassettes is thus facilitated and the said mat then returns to its initial shape.

3. A box in accordance with claim 1, further characterized in that the two said identical box elements are mounted together by means of hinges.

4. A box in accordance with claim 1, further characterized in that a bolt is provided for fixing together the two said box elements.

5. A box in accordance with claim 4, further characterized in that the said bolt is a rotating bolt with two identical semi-circular latches.

6. A box in accordance with claim 1, further characterized in that it may be joined together side by side in the open position to other identical boxes inside a carrying tray, which may rest flat or may be suspended.

7. A box in accordance with claim 1, further characterized in that it comprises a holding means.

* * * * *